United States Patent
Jalbert et al.

(10) Patent No.: US 9,567,865 B2
(45) Date of Patent: Feb. 14, 2017

(54) TURBOMACHINE BLADE CLEARANCE CONTROL SYSTEM

(71) Applicant: Hamilton Sundstrand Corporation, Charlotte, NC (US)

(72) Inventors: Peter L. Jalbert, Granby, CT (US); William E. Rhoden, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 396 days.

(21) Appl. No.: 14/247,693

(22) Filed: Apr. 8, 2014

(65) Prior Publication Data
US 2015/0285087 A1    Oct. 8, 2015

(51) Int. Cl.
| F04D 27/02 | (2006.01) |
| F01D 11/16 | (2006.01) |
| F01D 11/22 | (2006.01) |
| F01D 21/00 | (2006.01) |
| G01B 15/00 | (2006.01) |
| G01B 7/14  | (2006.01) |

(52) U.S. Cl.
CPC .............. *F01D 11/16* (2013.01); *F01D 11/22* (2013.01); *F01D 21/003* (2013.01); *G01B 7/14* (2013.01); *G01B 15/00* (2013.01)

(58) Field of Classification Search
CPC ........ F01D 11/16; F01D 11/22; F01D 21/003; G01B 15/00; G01B 7/14
See application file for complete search history.

(56) References Cited

U.S. PATENT DOCUMENTS

| 9,291,069 B2 * | 3/2016 | Leogrande | F01D 11/025 |
| 2003/0094956 A1 | 5/2003 | Orenstein | |
| 2009/0128166 A1 | 5/2009 | Webster | |
| 2010/0066387 A1 * | 3/2010 | Bosselmann | G01B 15/00 324/644 |
| 2010/0303612 A1 * | 12/2010 | Bhatnagar | F01D 11/22 415/127 |
| 2012/0057958 A1 * | 3/2012 | Klingels | F01D 11/22 415/1 |
| 2016/0047266 A1 * | 2/2016 | Powell | F01D 11/22 415/1 |

OTHER PUBLICATIONS

Extended European Search Report dated Sep. 2, 2015 issued on corresponding European Patent Application No. 15162166.1.

* cited by examiner

*Primary Examiner* — Jesse Bogue
(74) *Attorney, Agent, or Firm* — Locke Lord LLP; Scott D. Wofsy; Daniel J. Fiorello

(57) ABSTRACT

A turbomachine blade clearance system includes an actuator including an actuating portion that can be fixed to an interior surface of a turbomachine housing and a shaft for actuating movement relative to the turbomachine housing, a turbomachine blade seal operatively connected to the shaft of the actuator and configured to move relative to the turbomachine housing to adjust a distance from a turbomachine blade of a turbomachine to maintain a predetermined gap clearance between the blade seal and the blade, a waveguide disposed within the shaft, and at least one antenna disposed in electromagnetic communication with the waveguide such that a signal from the antenna can be directed by the waveguide.

20 Claims, 3 Drawing Sheets

TURBOMACHINE BLADE CLEARANCE CONTROL SYSTEM

BACKGROUND

1. Field

The present disclosure relates to turbomachines, and more particularly to turbomachine blade clearance.

2. Description of Related Art

Turbomachines are meticulously designed to have minimal clearance between the outer edges of the blades and the inner surfaces of the turbomachine casing. With more clearance comes more aerodynamic inefficiency in the blades. Turbine blades, for example, have a series of TBC (Thermal Barrier Coatings) coated plates surrounding each rotor stage. Initially, the ceramic contacts the outer edge of the plate and is abraded to form fit the turbine blade. However, even such tightly engineered technology cannot prevent the relative differential thermal expansion of the turbomachine blades and surrounding components, leading to a gap or excessive contact under certain operability conditions. The clearances between the blades and seals are typically oversized for normal operation to prevent rubbing in more extreme conditions. The oversizing of these gaps represents a loss in the overall engine cycle efficiency. Determining the distance of clearance can be difficult and require separate waveguides, wires, and complex circuitry which can add weight and reduce the value of the entire clearance system.

Such conventional methods and systems have generally been considered satisfactory for their intended purpose. However, there is still a need in the art for a system to improve sealing of turbine blades and measurements of gap distance, for example. The present disclosure provides a solution for this problem.

SUMMARY

In at least one aspect of this disclosure, a turbomachine blade clearance system includes an actuator including an actuating portion that can be fixed to an interior surface of a turbomachine housing and a shaft for actuating movement relative to the turbomachine housing, a turbomachine blade seal operatively connected to the shaft of the actuator and configured to move relative to the turbomachine housing to adjust a distance from a turbomachine blade of a turbomachine to maintain a predetermined gap clearance between the blade seal and the blade, a waveguide disposed within the shaft, and at least one antenna disposed in electromagnetic communication with the waveguide such that a signal from the antenna can be directed by the waveguide.

The shaft can include a hollow shape defining the waveguide. The actuating portion of the actuator can include any suitable actuator such as a linear mechanical actuator and/or a piezo-electric actuator. The system can further include a plurality of actuators connected to the turbomachine blade seal.

The system can further include a controller configured to control actuation of the shaft. In some embodiments, the system can further include a sensing system configured to output at least a first electromagnetic wave having a first frequency and a second electromagnetic wave having second frequency from the at least one antenna.

The turbomachine blade seal can be configured to reflect the first frequency back into the waveguide and pass the second frequency therethrough to a reflection point. The reflection point can be located on a portion of a rotating assembly connected to the turbomachine blade or on the turbomachine blade. In some embodiments, the turbomachine blade can be a shrouded bladed such that two or more blades are interconnected via a shroud. In such embodiments, the reflection point can alternatively or conjunctively be located on and/or form part of the shroud that connects each turbomachine blade.

The turbomachine blade seal can include a wave-filter feature to reflect the first frequency and pass the second frequency. In some embodiments, the wave-filter feature can be at least one of a portion of material configured to reflect the first frequency and pass the second frequency, an aperture sized to reflect the first frequency and pass the second frequency, or a mechanical feature.

The sensing system can be configured to receive the first and second frequencies after reflection and to determine a difference in distance traveled by the first and second frequencies. The sensing system can be configured to determine a gap distance based on the determined difference in distance traveled by the first and second frequencies.

In some embodiments, the controller can be configured to communicate with the sensing system and to control actuation of the turbomachine blade seal to a predetermined sensed gap distance.

In accordance with at least one aspect of this disclosure, a method includes directing at least one frequency through a waveguide disposed in or defined by a turbomachine blade seal actuator shaft, and receiving the at least one frequency at an antenna to determine a gap distance.

As disclosed herein, the at least one frequency can include at least a first frequency and a second frequency. The method can further include reflecting the first frequency off of a portion of a turbomachine blade seal that is connected to the turbomachine blade seal actuator shaft and passing the second frequency through the turbomachine blade seal to a reflection point.

In some embodiments, the receiving step can include receiving, at the antenna, the first frequency and the second frequency after reflection. The method can further include determining a distance traveled of each frequency. In some embodiments, the method can further include subtracting the distance traveled of each frequency to obtain a reference distance of the turbomachine blade seal to the reflection point. The method can further include determining gap distance based on the reference distance.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
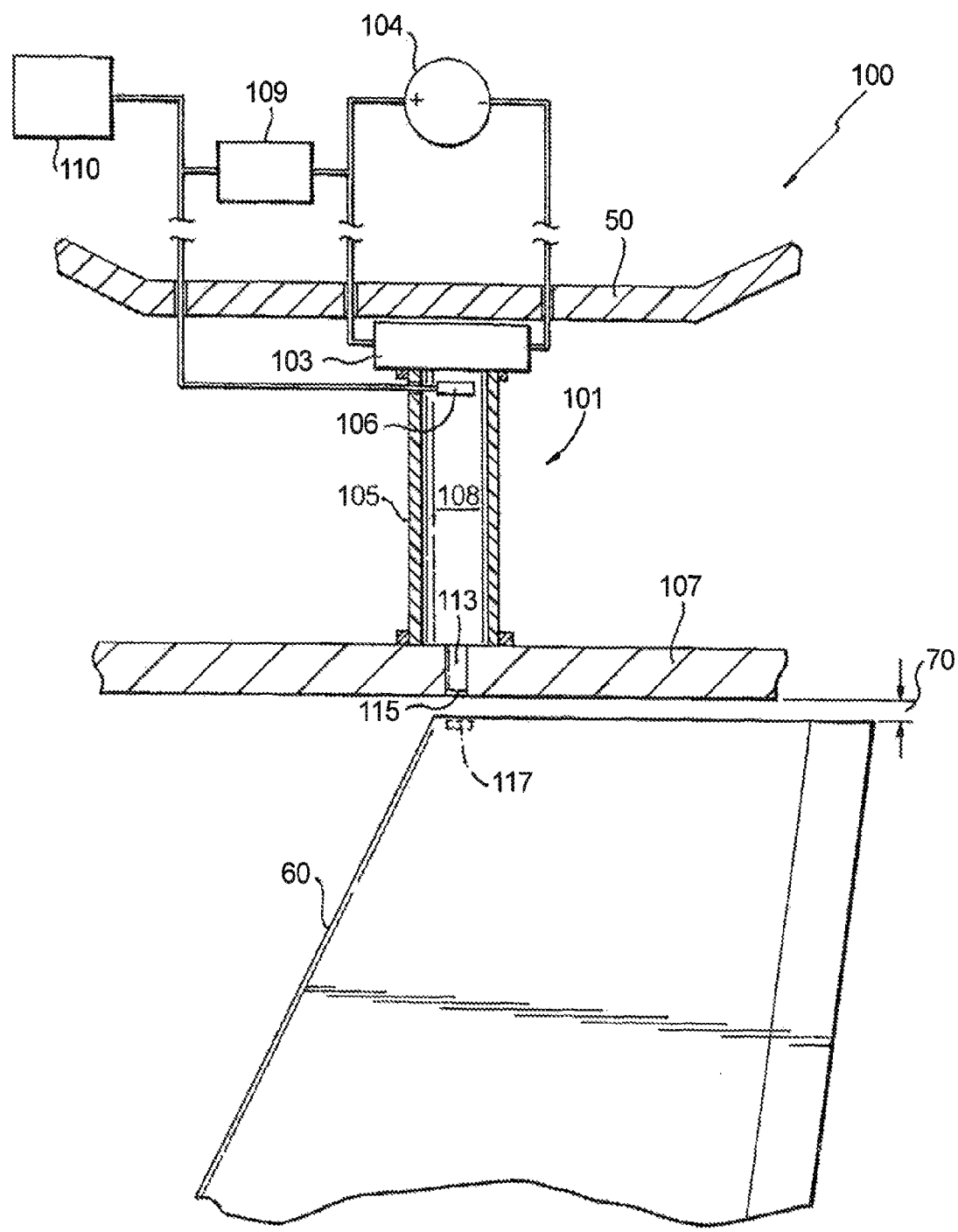
FIG. 1 is a cross-sectional view of an embodiment of a turbomachine blade clearance system constructed in accordance with the present disclosure, showing an actuator connected to a turbomachine blade seal.
Figure 2:
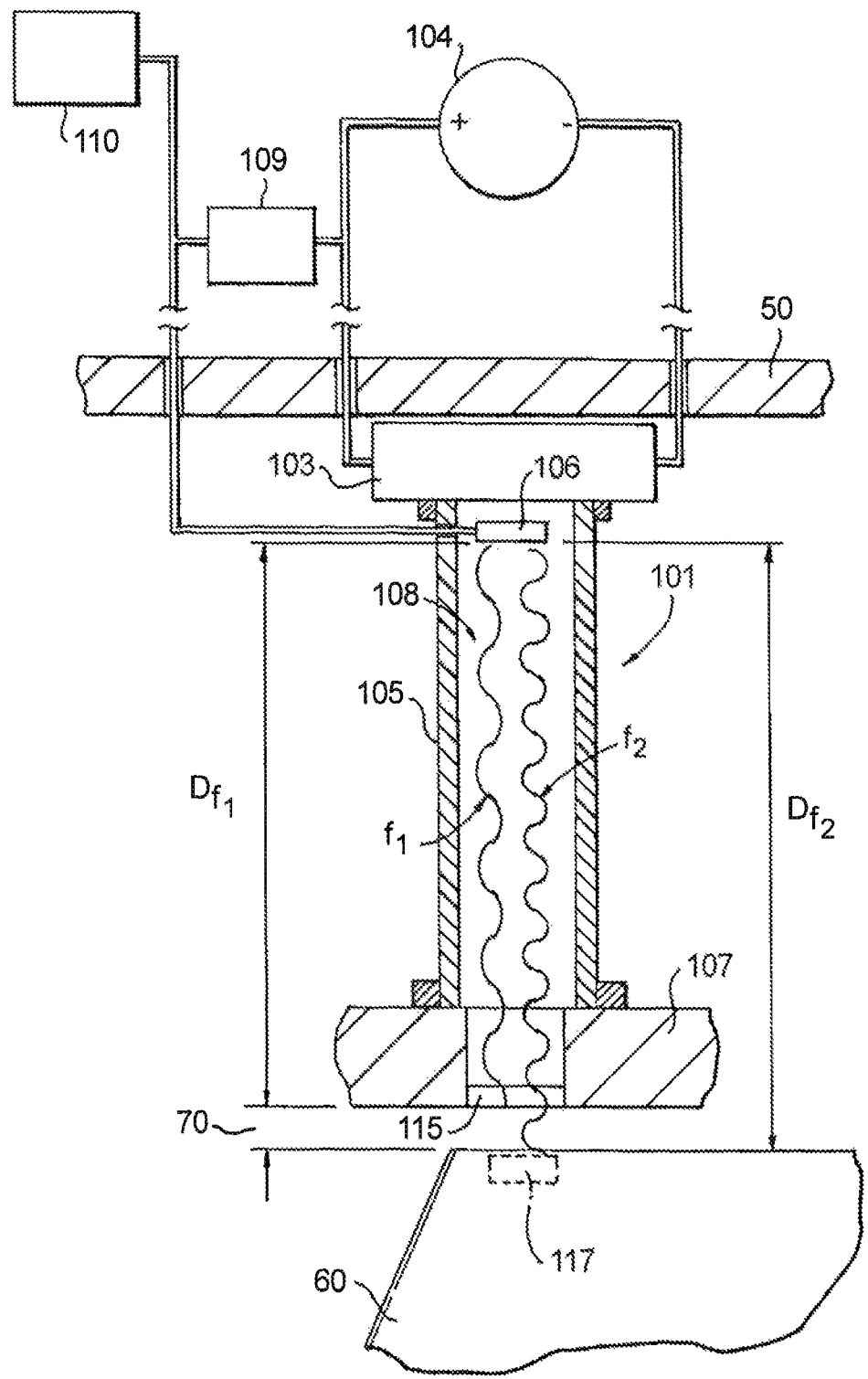
FIG. 2 is a partial, cross-sectional view of the system of FIG. 1, shown disposed in a turbomachine relative to a turbomachine blade and showing schematically waves at a first frequency and a second frequency in the waveguide.

Reference will now be made to the drawings wherein like reference numerals identify similar structural features or aspects of the subject disclosure. For purposes of explanation and illustration, and not limitation, a perspective view of an embodiment of a turbomachine blade clearance system in accordance with the disclosure is shown in FIGS. 1 and 2, and is designated generally by reference character 100. Another example embodiment of the turbomachine blade clearance system in accordance with the disclosure, or aspects thereof, is provided in FIG. 3, as will be described. The systems and methods described herein can be used to determine and/or control a gap size between a turbomachine blade and a turbomachine blade seal to control the amount of leakage therebetween.

In at least one aspect of this disclosure, the turbomachine blade clearance system 100 includes an actuator 101 having an actuating portion 103 which can be fixed to an interior surface of a turbomachine housing 50 and a shaft 105 for actuating movement relative to the turbomachine housing 50. The system 100 further includes a turbomachine blade seal 107 operatively connected to the shaft 105 of the actuator 101 and configured to move relative to the turbomachine housing 50 to adjust a distance from a turbomachine blade 60 of a turbomachine to maintain a predetermined blade clearance 70 between the blade seal 107 and the blade 60.

The turbomachine blade seal 107 can be any suitable turbomachine blade outer air seal such as, but not limited to, a ceramic coated (e.g. TBC) turbine outer air blade seal, and can be attached to the shaft 105 in any suitable manner, including, but not limited to, adhesion, welding, bolting, the like, and/or any combination thereof.

The actuator 101 can include any suitable actuator such as a linear mechanical actuator and/or a piezo-electric actuator. In some embodiments, the piezo-electric actuator is configured to be a high temperature piezo-electric actuator for use in high temperature conditions of a turbomachine and can be connected to any suitable power supply 104.

A waveguide 108 can be disposed within the shaft 105. In some embodiments, the shaft 105 can include a hollow shape defining the waveguide 108 instead of having a separate waveguide 108 disposed therein. The waveguide 108 can also include a suitable filler material to fill the hollow shaft 105.

At least one antenna 106 can be disposed in electromagnetic communication with the waveguide 108 such that a signal from the antenna 106 can be directed by the waveguide 108. In some embodiments, the antenna 106 can be disposed within the waveguide 108 as shown in the embodiment of FIG. 1.

The actuator 101 can be configured to move the turbomachine blade seal 107 in any suitable increment or distance at any suitable speed. In some embodiments, the actuator 101 is configured to move the turbomachine blade seal 107 within a total range of about 0.0254 mm (about 0.001 in) to about 2.54 mm (about 0.100 in) radially, more specifically about 1.27 mm (about 0.050 in) radially, between a fully retracted position and a fully extended position. While specific ranges are disclosed, it is contemplated that, the movable range is dependent upon the size and type of the engine and can be selected to account for maximum expansion and contraction of certain engine components, e.g., a turbomachine blade 60.

In some embodiments, the actuator 101 can move the turbomachine blade seal 107 between a fully retracted position and a fully extended position within about 5 seconds. For example, in the case where the fully extended position is about 1.27 mm (about 0.050 in) from the fully retracted position, the actuator 101 can be configured to move at a rate of about 0.254 mm/s (about 0.01 in/s) in a steady state acceleration or deceleration. In some operations, during a slam acceleration and/or deceleration state, the actuator can be configured to move the turbomachine blade seal 107 between a fully retracted position and a fully extended position within about 2.5 seconds (or about twice as fast).

The actuator 101 can provide any suitable force to overcome any inertial considerations of the system 100 and any internal forces associated with a turbomachine. In some embodiments, the force provided by the actuators 101 can be about 444.82 N (about 100 lbf) to about 1334.47 N (about 300 lbf), more specifically about 1067.57 N (about 240 lbf).

As disclosed herein, the actuator 101 can be configured to operate in high temperature conditions associated with a turbomachine, such as, but not limited to, between about 93.33 degrees C. (about 200 degrees F.) to about 815.56 degrees C. (about 1500 degrees F.). In other embodiments, the actuator 101 can be configured to operate in any suitable temperature.

Actuator 101 can be controlled via a mechanical system, electromechanical system, or electrical circuit attached thereto. The actuator 101 can be hard wired or controlled wirelessly via any suitable control mechanism.

In some embodiments, the turbomachine blade clearance system 100 can further include a controller 109 configured to control actuation of the shaft 105 and/or the actuating portion 103 (e.g., by controlling power supply 104 to a piezo-electric actuating portion). It is also envisioned that the turbomachine blade clearance system 100 can have memory operatively connected to cause execution of a prediction algorithm by the controller to cause actuation of the shaft 105 to move the turbomachine blade seal 107 to a predicted position for a desired blade clearance 70 based on at least one input. The at least one input can be one or more of blade rotational speed, temperature, pressure, blade acceleration, and/or thrust input.

In some embodiments, the system 100 and/or controller 109 can further include a sensing system 110 configured to output a first frequency $f_1$ and a second frequency $f_2$ from the at least one antenna 106.

Figure 3:
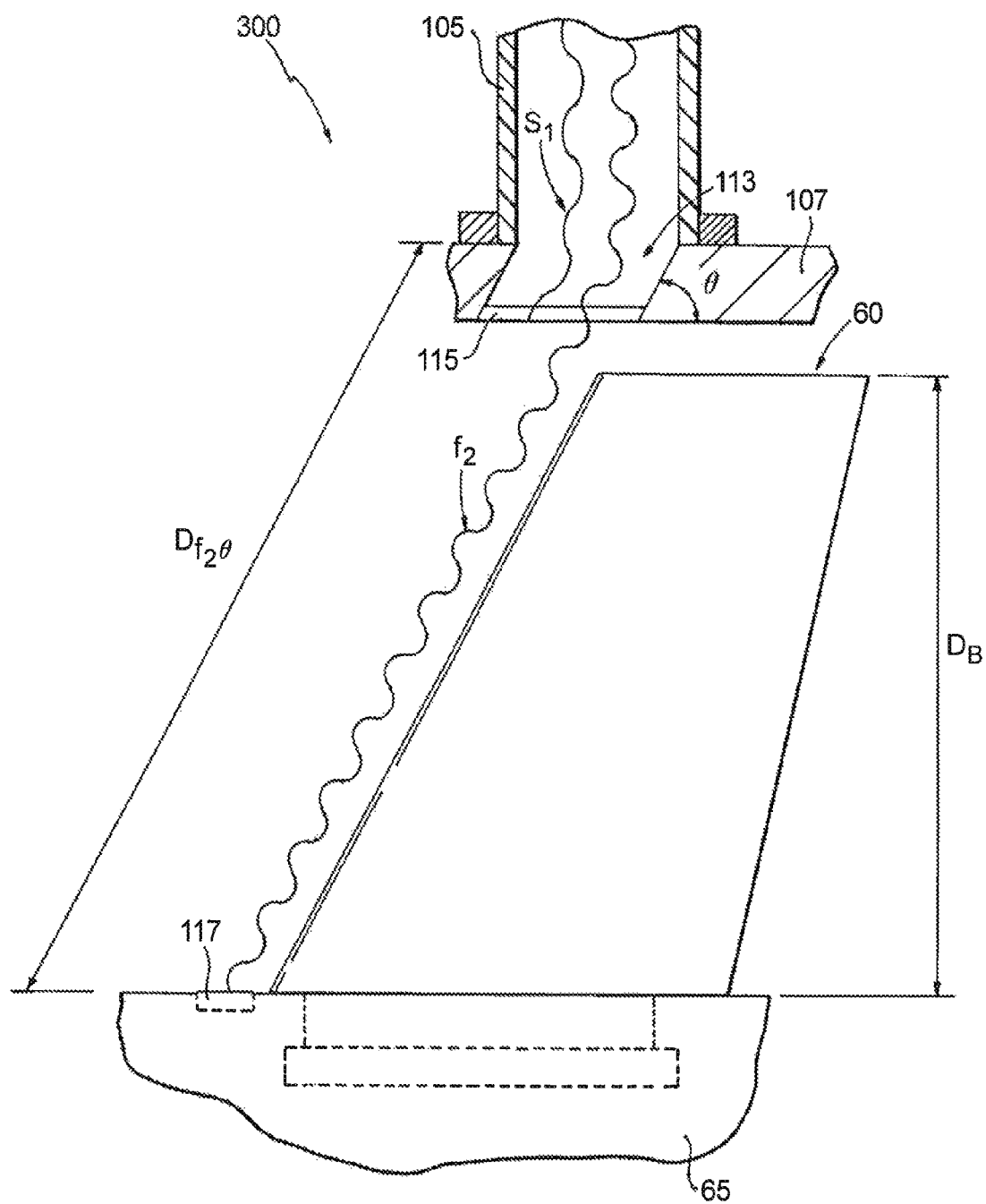
FIG. 3 is a partial, cross-sectional view of another embodiment of a turbomachine blade clearance system constructed in accordance with the present disclosure, showing an angled waveguide portion disposed in the turbomachine blade seal.

Referring to FIGS. 2 and 3, the turbomachine blade seal 107 can be configured to reflect the first frequency $f_1$ back into the waveguide 108 and pass the second frequency $f_2$ therethrough to a reflection point 117 disposed in any suitable location on the turbomachine (e.g., a portion of a blade 60 and/or a rotating assembly 65 of the turbomachine).

Referring to FIG. 1, the turbomachine blade seal 107 can include a secondary waveguide 113 and/or a wave-filter feature 115 to reflect the first frequency $f_1$ and pass the second frequency $f_2$. In some embodiments, the wave-filter feature 115 can be a portion of any suitable material that is configured to reflect the first frequency $f_1$ and pass the second frequency $f_2$. In other embodiments, the wave-filter feature 115 and/or secondary waveguide 113 can be an aperture sized to reflect the first frequency $f_1$ and pass the second frequency $f_2$. The wave-filter feature 115 can also be any suitable mechanical feature. While the wave-filter feature 115 is depicted at a radially inward portion of the seal 107, it can be placed at any suitable portion including a radially outward portion (e.g., the portion adjacent to waveguide 108). Also, it is contemplated that, in some embodiments, there may be no secondary waveguide 113 and just be the wave-filter feature 115 that extends the width of the seal 107 or a portion thereof.

In some embodiments, the secondary waveguide 113 and/or the wave-filter feature 115 can be aligned with the waveguide 108 as shown in FIGS. 1 and 2. Referring to FIG. 3, the secondary waveguide 113 and/or the wave-filter feature 115 can be offset by an angle "Θ" such that the wave is turned to redirect the first frequency $f_1$ and/or the second frequency $f_2$.

The sensing system 110 can be configured to receive the first frequency $f_1$ and the second frequency $f_2$ after reflection and to determine a difference in distance traveled by the first frequency $D_{f1}$ and second frequency $D_{f2}$ due to changes in the electromagnetic signals. In some embodiments, the change in the electromagnetic signal can be determined using phase-domain reflectometry or other techniques that compare the phase shift of the incident and reflected waveforms. In such cases, the phase shift can be equated to the distance to the reference point or measurement point.

The sensing system 110 can be configured to determine a gap distance 70 based on the determined difference in distance traveled by the first and second frequencies $f_1$, $f_2$ via subtraction of the distances. If the wave-filter feature 115 is substantially close enough to the radially inward portion of the seal 107 as shown in FIGS. 1-3, the gap distance 70 would equal: $D_{f2}-D_{f1}$ in the case of FIGS. 1 and 2; $D_{f2}-D_B-D_{f1}$ in the case of an embodiment where the reference reflector 117 is located on a portion of the rotating assembly 65; $D_{f2}e^*\sin(e)-D_B-D_{f1}$ in the case of an angled embodiment as shown in FIG. 3. If the wave-filter feature 115 is disposed anywhere else along the thickness of the of the seal 107, the gap distance 70 would equal $D_{f2}-D_{f1}$ minus the distance away from the radially inward face of the seal 107 that the first frequency $f_1$ is reflected.

In some embodiments, it is contemplated that distance $D_{f1}$ can be assume to be a predetermined value, thus requiring the use of only a signal having the second frequency $f_2$. In such an embodiment, a wave-filter feature 115 can be removed. As shown, in some embodiments, the controller 109 can be configured to communicate with the sensing system 110 and to control actuation of the turbomachine blade seal 107 automatically to a predetermined sensed gap distance 70. In some embodiments, the sensing system 110 can be included in the controller 109 and implemented in any suitable manner.

The turbomachine blade clearance system 100 can further include a plurality of actuators 101 as described above connected to the turbomachine blade seal 107 as describe above. The actuators 101 can be radially oriented such that actuation of the shaft 105 of each actuator 101 causes radial movement of the turbomachine blade seal 107 attached thereto, similar to the embodiment shown in FIGS. 1-3.

It is also envisioned that the actuators 101 can be oriented at an angle oblique to the radial axis such that actuation of the shaft 105 of each actuator 101 causes radial and axial movement of the turbomachine blade seal 107 attached thereto in order to control a tilt angle or other orientation of the turbomachine blade seal 107 to more precisely control blade clearance 70. In such embodiments, shafts 105 can be operatively connected to the blade seal 107 via any suitable moving connection, e.g., pin connection 401 or the like, allowing movement of the blade seal 107 relative to the shafts 105.

In some embodiments, the actuator 101 can be axially oriented such that actuation of the shaft 105 extending from the actuating portion 105 of each actuator 101 causes axial movement of the turbine blade seal 107 attached thereto. In such embodiments, the blade seal 107 and/or the turbomachine housing 50 can be shaped and/or positioned such that there is an angle between a surface of the blade seal 107 and a longitudinal axis of the turbomachine. For example, the turbine blade seal 107 can be disposed in a conical section of a turbomachine such that each blade seal 107 is at an angle to a longitudinal axis of the turbomachine. In such embodiments, when axial actuation of the shaft 105 of each actuator 101 causes axial movement of the angled turbomachine blade seal 107 attached thereto, the turbomachine blade seal 107 can be moved closer to or further from an edge of blade 60 to control the seal therebetween. Controlling the blade seal 107 axially in this manner can allow for more precise clearance control beyond the precision limits of actuator 101 as a function of the angular component. The turbomachine blade clearance system with an axial actuator can also include an added radial actuator 101 for increased precision control.

In another aspect of this disclosure, a turbomachine can include a plurality of actuators 101 having blade seals 107 attachable thereto. In some embodiments, a turbomachine can include any suitable number of actuators 101 disposed circumferentially around the interior surface of the turbomachine. Each actuator 101 can be controlled independently or in any suitable combination via a controller 109 of the above described control systems. The number of actuators 101 disposed in a turbomachine can vary depending on the size of the turbomachine and the amount of actuators 101 connected to each blade seal 107. In this respect, smaller engines may have less actuators 101 and larger engines may have more.

Further disclosed herein is a method for controlling blade clearance 70 including actuating an actuator 101 attached to a blade seal 107 to move the blade seal 107 to a predetermined and/or desired distance from blade 60. In accordance with at least one aspect of this disclosure, a method includes directing at least one frequency through a waveguide 108 disposed in or defined by a turbomachine blade seal actuator shaft 105, and receiving the at least one frequency at an antenna 106 to determine a gap distance 70.

As disclosed herein, the at least one frequency can include at least a first frequency $f_1$ and a second frequency $f_2$. The method can further include reflecting the first frequency $f_1$ off of a portion of a turbomachine blade seal 107 that is connected to the turbomachine blade seal actuator shaft 105 and passing the second frequency $f_2$ through the turbomachine blade seal 107 to a reflection point 117.

In some embodiments, the receiving step can include receiving the first frequency $f_1$ and the second frequency $f_2$ after reflection at the antenna 106. The method can further include determining a distance traveled of each frequency. In some embodiments, the method can further include subtracting the distance traveled of each frequency to obtain a reference distance of the turbomachine blade seal 107 to the reflection point 117. The method can further include determining gap distance 70 based on the reference distance.

The methods and systems of the present disclosure, as described above and shown in the drawings, provide for a turbomachine with superior properties including enhanced blade clearance control. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A turbomachine blade clearance system, comprising: an actuator including an actuating portion configured to be fixed to an interior surface of a turbomachine housing and a shaft connected to the actuating portion for actuating movement relative to the turbomachine housing, wherein the actuator is a single rigid component; a turbomachine blade seal operatively connected to the shaft of the actuator and configured to move relative to the turbomachine housing to adjust a distance from a turbomachine blade of a turbomachine to maintain a predetermined gap clearance between the blade seal and the blade; a waveguide disposed within the shaft; and at least one antenna disposed in electromagnetic communication with the waveguide such that a signal from the antenna can be directed by the waveguide.

2. The turbomachine blade clearance system of claim 1, wherein the shaft includes a hollow shape defining the waveguide.

3. The turbomachine blade clearance system of claim 1, wherein the actuating portion of the actuator includes a linear mechanical actuator or a piezo-electric actuator.

4. The turbomachine blade clearance system of claim 1, further comprising a plurality of actuators connected to the turbomachine blade seal.

5. The turbomachine blade clearance system of claim 1, further comprising a controller configured to control actuation of the actuating portion.

6. The turbomachine blade clearance system of claim 5, further including a sensing system configured to output at least a first electromagnetic wave having a first frequency and a second electromagnetic wave having second frequency from the at least one antenna.

7. The turbomachine blade clearance system of claim 6, wherein the turbomachine blade seal is configured to reflect the first frequency back into the waveguide and pass the second frequency therethrough to a reflection point.

8. The turbomachine blade clearance system of claim 7, wherein the reflection point is located on a portion of a rotating assembly connected to the turbomachine blade or on the turbomachine blade.

9. The turbomachine blade clearance system of claim 7, wherein the turbomachine blade seal includes a wave-filter feature to reflect the first frequency and pass the second frequency.

10. The turbomachine blade clearance system of claim 9, wherein the wave-filter feature is at least one of a portion of material configured to reflect the first frequency and pass the second frequency, an aperture sized to reflect the first frequency and pass the second frequency, or a mechanical feature.

11. The turbomachine blade clearance system of claim 7, wherein the sensing system is configured to receive the first and second frequencies after reflection and to determine a difference in distance traveled by the first and second frequencies.

12. The turbomachine blade clearance system of claim 11, wherein the sensing system is configured to determine a gap distance based on the determined difference in distance traveled by the first and second frequencies.

13. The turbomachine blade clearance system of claim 12, wherein the controller is configured to communicate with the sensing system and to control actuation of the turbomachine blade seal to a predetermined sensed gap distance.

14. A method, comprising: directing at least one signal frequency through a waveguide disposed in or defined by a turbomachine blade seal actuator shaft of an actuator, wherein the actuator includes an actuating portion configured to be fixed to an interior surface of the turbomachine housing and the shaft is connected to the actuating portion for actuating movement relative to the turbomachine housing, wherein the actuator is a single rigid component, and wherein the shaft is operatively connected to a turbomachine blade seal and configured to move relative to the turbomachine housing to adjust a distance from a machine blade of a turbomachine; and receiving the at least one frequency at an antenna to determine and maintain a gap distance.

15. The method of claim 14, wherein the at least one frequency includes at least a first frequency and a second frequency.

16. The method of claim 15, further comprising reflecting the first frequency off of a portion of a turbomachine blade seal that is connected to the turbomachine blade seal actuator shaft and passing the second frequency through the turbomachine blade seal to a reflection point.

17. The method of claim 16, wherein receiving step includes receiving, at the antenna, the first frequency and the second frequency after reflection.

18. The method of claim 17, further comprising determining a distance traveled of each frequency.

19. The method of claim 18, further comprising subtracting the distance traveled of each frequency to obtain a reference distance of the turbomachine blade seal to the reflection point.

20. The method of claim 19, further comprising determining gap distance based on the reference distance.

* * * * *